(12) United States Patent
Hilmer et al.

(10) Patent No.: US 9,254,592 B2
(45) Date of Patent: Feb. 9, 2016

(54) ARTICLES COMPRISING RUBBER, THERMOPLASTIC POLYURETHANE AND ENGINEERING POLYMER

(71) Applicant: BASF SE, Ludwigshafen (DE)

(72) Inventors: Klaus Hilmer, Brockum (DE); Bernhard Aumer, Fischbach (DE)

(73) Assignee: BASF SE, Ludwigshafen (DE)

( * ) Notice: Subject to any disclaimer, the term of this patent is extended or adjusted under 35 U.S.C. 154(b) by 173 days.

(21) Appl. No.: 14/075,696

(22) Filed: Nov. 8, 2013

(65) Prior Publication Data

US 2014/0091498 A1 Apr. 3, 2014

Related U.S. Application Data

(63) Continuation of application No. 12/089,927, filed as application No. PCT/EP2006/067737 on Oct. 25, 2006, now abandoned.

(30) Foreign Application Priority Data

Nov. 3, 2005 (DE) .......................... 10 2005 052 932

(51) Int. Cl.
| | |
|---|---|
| B32B 27/40 | (2006.01) |
| B29C 45/00 | (2006.01) |
| B29C 45/16 | (2006.01) |
| B29C 59/14 | (2006.01) |
| B29C 65/00 | (2006.01) |
| B32B 25/08 | (2006.01) |
| C08J 5/12 | (2006.01) |
| B32B 25/12 | (2006.01) |
| B32B 25/14 | (2006.01) |
| B32B 27/08 | (2006.01) |
| B32B 27/34 | (2006.01) |
| B32B 27/36 | (2006.01) |
| B29C 45/14 | (2006.01) |
| B29K 21/00 | (2006.01) |
| B29K 67/00 | (2006.01) |
| B29K 75/00 | (2006.01) |
| B29K 77/00 | (2006.01) |

(52) U.S. Cl.
CPC ......... *B29C 45/0001* (2013.01); *B29C 45/1657* (2013.01); *B29C 45/1671* (2013.01); *B29C 59/14* (2013.01); *B29C 66/71* (2013.01); *B32B 25/08* (2013.01); *B32B 25/12* (2013.01); *B32B 25/14* (2013.01); *B32B 27/08* (2013.01); *B32B 27/34* (2013.01); *B32B 27/36* (2013.01); *B32B 27/40* (2013.01); *C08J 5/12* (2013.01); *B29C 45/14311* (2013.01); *B29C 2045/14885* (2013.01); *B29C 2045/1662* (2013.01); *B29K 2021/00* (2013.01); *B29K 2067/00* (2013.01); *B29K 2067/006* (2013.01); *B29K 2075/00* (2013.01); *B29K 2077/00* (2013.01); *B32B 2250/03* (2013.01); *B32B 2250/24* (2013.01); *B32B 2310/14* (2013.01); *B32B 2605/00* (2013.01); *Y10T 428/269* (2015.01); *Y10T 428/31551* (2015.04)

(58) Field of Classification Search
CPC ...... B29C 59/14; B29C 66/028; B29C 66/02; B29C 65/00; B29C 65/14; B29C 45/1657; B29C 45/1671; B29C 2045/1662; B32B 27/40; B32B 25/04; B32B 25/08; B32B 25/12; B32B 25/14
See application file for complete search history.

(56) References Cited

U.S. PATENT DOCUMENTS

| | | | |
|---|---|---|---|
| 4,312,693 A | 1/1982 | Salensky et al. | |
| 5,163,431 A | 11/1992 | Griep | |
| 5,472,782 A | 12/1995 | Naritomi | |
| 6,013,153 A * | 1/2000 | Koinuma et al. | 156/272.6 |
| 6,793,759 B2 * | 9/2004 | Chaudhury et al. | 156/272.6 |
| 2003/0132561 A1 | 7/2003 | Burlage et al. | |
| 2004/0018789 A1 | 1/2004 | Marchbanks et al. | |
| 2004/0171767 A1 * | 9/2004 | Pohlmann et al. | 525/453 |
| 2004/0213934 A1 * | 10/2004 | Abell et al. | 428/36.91 |
| 2005/0084685 A1 | 4/2005 | Lacroix et al. | |
| 2005/0187320 A1 | 8/2005 | Malz et al. | |

FOREIGN PATENT DOCUMENTS

| | | |
|---|---|---|
| DE | 103 08 989 | 9/2004 |
| EP | 1 568 487 | 8/2005 |

OTHER PUBLICATIONS

Lihua Engineering Plastic—Engineering Plastic material solution, http:/www.lihua-plastic.com/plastic_en/product.htm. Retrieved on Feb. 15, 2012.
Lubrizol, Eastane 5700 TPI Technical Data Sheet, http:/www.lubrizol.com/Engineered-Polymers/Products/Estane5700.html. Retrieved on Feb. 15, 2012.
Performance Plastics, Relationship: Shore A to Shore D, http:/www.performance-plastics.co.uk/pdf/relationship_shoreA_ShoreD_hardness.pdf. Retrieved on Feb. 15, 2012.
Plastics International: Hardness Scale—Durometer Comparison of Materials. Retrieved on Apr. 26, 2013. http://www.plasticsintl.com/polyhardness.htm.
Hegemann et al., "Plasma treatment of polymers for surface and adhesion improvement". Nuclear Instruments and Methods in Physics Research B 208 (2003) 281-286.
CNBC: Research and Markets: Engineering Plastics—A Global Market Overview. Retrieved on Apr. 26, 2013. http://www.cnbc.com/id/100600352.
Darcoid: thermoplastic Elastomer Sheet. Retrieved on Apr. 23, 2013. http://www.darcoid.com/includes/thermoplastic-elastomer-sheet.html.

\* cited by examiner

*Primary Examiner* — Daniel McNally
(74) *Attorney, Agent, or Firm* — Oblon, McClelland, Maier & Neustadt, L.L.P.

(57) ABSTRACT

Item comprising thermoplastic polyurethane, which has, respectively, direct-contact adhesive bonding not only to rubber but also to engineering plastic.

20 Claims, No Drawings

ARTICLES COMPRISING RUBBER, THERMOPLASTIC POLYURETHANE AND ENGINEERING POLYMER

This application is a Continuation of U.S. application Ser. No. 12/089,927, filed on Nov. 11, 2008, now abandoned.

The invention relates to items comprising thermoplastic polyurethane, which has, respectively, direct-contact adhesive bonding not only to rubber but also to engineering plastic, preferably polyamide, polybutylene terephthalate and/or polyethylene terephthalate, particularly preferably polyamide and/or polybutylene terephthalate, in particular polyamide. The invention further relates to processes for production of an item preferably according to any of the claims preferably by means of multicomponent injection molding, particularly preferably by means of two-component injection molding, comprising thermoplastic polyurethane, which has, respectively, direct-contact adhesive bonding not only to rubber but also to engineering plastic, preferably polyamide, polybutylene terephthalate and/or polyethylene terephthalate, particularly preferably polyamide and/or polybutylene terephthalate, in particular polyamide.

Composites which comprise rubber are of interest for a variety of applications, in particular including vibration-damping. The composites here generally comprise a high-strength material, such as metal or a high-strength plastic; this material fixes the rubber in the composite at least to some extent and generally serves for mounting. The high-strength plastics used often comprise engineering plastics, which are well known to the person skilled in the art. A disadvantage of their use is that in order to achieve satisfactory strength of bond between the high-strength plastic and rubber it is currently essential to use adhesives as adhesion promoters. The adhesion promoter is the cause of high costs in the manufacturing process. Furthermore, application of the adhesives in commonly used processes poses considerable problems, which markedly increase production cost.

It was therefore an object of the present invention to achieve bonding between rubber and engineering plastics, preferably polyamide, polybutylene terephthalate and/or polyethylene terephthalate, particularly preferably polyamide and/or polybutylene terephthalate, in particular polyamide. Use of conventional adhesives should be eliminated here. The items developed should particularly preferably be those which are obtainable by means of injection molding and which include bonding between rubber and engineering plastic.

These objects were achieved via items comprising thermoplastic polyurethane, which has, respectively, direct-contact adhesive bonding not only to rubber but also to engineering plastic, preferably polyamide, polybutylene terephthalate and/or polyethylene terephthalate, particularly preferably polyamide and/or polybutylene terephthalate, in particular polyamide. The thermoplastic polyurethane here is preferably present between the rubber and the engineering plastic. The thermoplastic polyurethane therefore produces the adhesion between the rubber and the engineering plastic. There is preferably no adhesion promoter here between the thermoplastic polyurethane and the rubber, and between the thermoplastic polyurethane and the engineering plastic. "Without chemical adhesion promoter" here means that between the thermoplastic polyurethane and the rubber and, respectively, the engineering plastic, in particular the polyamide, there is no other component (adhesion promoter), i.e. no component other than the thermoplastic polyurethane and the rubber and, respectively, the engineering plastic, in particular the polyamide, in particular no adhesive. The plasma-treatment of the rubber item ensures that the thermoplastic polyurethane adheres to the rubber. On the other hand, adhesion of polyamide to thermoplastic polyurethane poses no problems, and therefore prior to the injection molding of the polyamide onto the thermoplastic polyurethane it is possible to omit any plasma-treatment of the surface for example of the thermoplastic polyurethane.

When a plasma-treated rubber part is inserted, using TPU as adhesion-promoting layer with respect to the thermoplastic, e.g. polyamide, it is possible to combine these materials in automated multicomponent injection-molding processes. This process can operate without solvents or reactive substances hazardous to health, and has the ability to bond these materials in an automated and low-cost process. Rubber part vulcanization and injection molding of a thermoplastic onto a material in one machine and in one mold is not currently a rational solution. Manufacture of the rubber part, or of an insert part with a rubber surface (since the insert part can, of course, also have an insert within itself), independently from the in-mold-coating process is rational and simplifies the automation of the manufacture of the entire component. The pretreatment of the rubber surface, the insertion process, and the multicomponent injection-molding process, and also the demolding process, can be integrated without difficulty to give an integrated process. The plasma-treatment of the insert part preferably takes place outside the injection-molding machine. The plasma-treatment, the insertion into the injection-molding machine, and the injection molding can preferably be combined and automated in combination. The inventive composites here in particular have lower weight in comparison with aluminum/rubber or steel/rubber components. Furthermore, a marked cost reduction is achieved in comparison with the use of an adhesive as adhesion promoter. Also, rubber/polyamide needs no additional corrosion protection.

Further advantages are found in the high level of design freedom provided by the in-mold-coating of the rubber layer with any desired plastics structure. Controlled local bonding can be achieved. Thermoplastic polyurethane and engineering plastics, e.g. polyamide, can be bonded at relatively low cost by 2-component injection molding, but this is not achievable with adhesives.

A known method here for adhesive bonding to combine different thermoplastics consists in using multicomponent injection molding, e.g. two-component injection molding (≥2-c injection molding), for direct injection molding of one of these different plastics onto the other, giving an adhesive bond. To provide adhesion here, DE-B 103 08 727, DE-A 103 08 989, and Simon Amesöder et al., Kunststoffe 9/2003, pages 124-129 recommend that for certain combinations of materials the surface of one of the components be treated with plasma, and then the other component be injection-molded onto this plasma-treated surface.

It is preferable that the rubber and the engineering plastic, in particular the polyamide, have, respectively, separate direct-contact bonding to the thermoplastic polyurethane, and it is particularly preferable that the thermoplastic polyurethane is present between the rubber and the engineering plastic, in particular the polyamide.

In the inventive items, the thermoplastic polyurethane is preferably present between the rubber and the engineering plastic, in particular the polyamide, the thickness of the layer of the thermoplastic polyurethane preferably being from 0.2 mm to 6 mm, preferably from 0.2 mm to 5 mm, particularly preferably from 0.2 mm to 1.0 mm. The inventive items are preferably two-component injection-molded items with rubber insert part.

Items can in particular be products in which rubber is usually present adhering to a hard plastic. By way of example, these may be rubber bearings, e.g. for the mounting of machinery or motors, e.g. in motor vehicles or in motor vehicle chassis. Other examples are round bearings in which the rubber has been arranged as elastic component in the form of a ring-shaped item between an inner and an outer sleeve or bush based on polyamide. The rubber can have any desired shape in order, for example, to obtain a desired force-displacement curve for the mounting, and this means that it can be used in any vibration-damping or shock-absorbing mounting. Traditional application sectors are vibration-damping and noise-reducing components or modules, in particular mountings of machinery, in particular chassis mountings and motor mountings. The components are generally subject to high load. Stresses up to 200 MPa at 23° C. can occur in the thermoplastic in the vehicle sector, for example in engine mountings or coupling supports. Resistance is required with respect to brine, engine oils, and battery acids, and another requirement is very little tendency to creep at service temperatures of from −40° C. to 120° C. The inventive composite element meets these requirements.

The inventive items are preferably a multicomponent injection-molded item, preferably a two-component injection-molded item, i.e. items produced by multicomponent injection molding, preferably two-component injection molding, where the rubber item can preferably be inserted as insert part into the injection-molding apparatus. Two-component injection molding is well known for other combinations of materials and has been widely described. A usual method injects one component into a mold and then injection molds the second and third components onto the material.

Another object was to develop a process of maximum efficiency and effectiveness which can give items, preferably according to any of the claims, comprising thermoplastic polyurethane, which has, respectively, direct-contact adhesive bonding not only to rubber but also to engineering plastic, preferably polyamide, polybutylene terephthalate, and/or polyethylene terephthalate, particularly preferably polyamide and/or polybutylene terephthalate in particular polyamide. The items described at the outset should preferably be capable of production by means of injection molding, particularly preferably by means of multicomponent injection molding, in particular by means of two-component injection molding, preferably with rubber insert part.

This object was achieved by plasma-treating the surface of a rubber item, then bringing the thermoplastic polyurethane, preferably in the molten state, into contact with the plasma-treated surface, preferably injection-molding it onto the plasma-treated surface, and then applying the engineering plastic, preferably polyamide, polybutylene terephthalate and/or polyethylene terephthalate, particularly preferably polyamide and/or polybutylene terephthalate, in particular polyamide, to the thermoplastic polyurethane, preferably injection-molding it onto the thermoplastic polyurethane. It is therefore preferable that the thermoplastic polyurethane is applied by means of injection molding to the plasma-treated surface of the rubber. The thickness of the layer formed by the thermoplastic polyurethane on the rubber item can preferably be from 0.3 mm to 6 mm, preferably from 0.2 mm to 5 mm, particularly preferably from 0.2 mm to 1.0 mm. The engineering plastic, too, is preferably applied by means of injection molding to the surface of the thermoplastic polyurethane.

In a particularly preferred possible method for the inventive process, the surface of the rubber insert part is plasma-treated, the plasma-treated rubber insert part is inserted into a mold, thermoplastic polyurethane is then applied by means of injection molding to the plasma-treated surface, and then engineering plastic is molded by means of injection molding onto the thermoplastic polyurethane in the same mold.

This inventive process is the first to permit achievement of an adhesive bond between rubber and engineering plastic without adhesives, by injection molding. The adhesion here arises by way of the thermoplastic polyurethane, which has the advantage, like the engineering plastic, of being processable by means of injection molding. A process is thus provided which is simultaneously effective and efficient and which can provide adhesive bonds between rubber and engineering plastic without the need to resort to adhesives and the difficulties associated with their application.

In a particularly preferred procedure, the surface of a rubber insert part is plasma-treated, thermoplastic polyurethane is then applied by means of injection molding, preferably multicomponent injection molding, to the plasma-treated surface, and then engineering plastic, preferably polyamide, polybutylene terephthalate and/or polyethylene terephthalate, particularly preferably polyamide and/or polybutylene terephthalate, in particular polyamide, is molded by means of injection molding onto the thermoplastic polyurethane preferably in the same mold. The plasma treatment of the rubber item here can take place in the injection mold in which the thermoplastic polyurethane is then injection-molded onto the rubber item, or outside the injection-molding apparatus, in which case the plasma-treated rubber item is inserted into the injection mold. It is preferable that the plasma treatment and the insertion into the machine are combined with one another and automated.

Particular preference is given to two-component injection molding, where the surface of a rubber item is plasma-treated, and then thermoplastic polyurethane is applied by means of injection molding to the plasma-treated surface of the rubber item, preferably being injection-molded onto this surface, and then engineering plastic is injection-molded onto the thermoplastic polyurethane. Injection molding is well known, as also is multicomponent injection molding, by the direct process and also by the insert process, in which an item is inserted into an injection mold.

Plasma treatment is well known and by way of example is described in the specifications cited at the outset. Plasma-treatment apparatus is obtainable by way of example from Plasmatreat GmbH, Bisamweg 10, 33803 Steinhagen, Germany.

It is preferable that a plasma is generated by means of high-voltage discharge in a plasma source, and that this plasma is brought into contact with the surface of the rubber item by means of a plasma nozzle, and that the plasma source is moved within a distance of from 2 to 25 mm with a velocity of from 0.1 m/min to 400 m/min, preferably from 0.1 m/min to 200 m/min, particularly preferably from 0.2 m/min to 50 m/min, relative to the surface of the rubber item. The plasma is preferably transported via gas flow along the discharge path onto the surface of the rubber item. Particular activated particles which may be mentioned as present within the plasma and serving for preparation of the surface of the plastic for adhesion are ions, electrons, free radicals, and photons. The plasma-treatment time is preferably from 1 ms to 100 s. Gases that can be used comprise oxygen, nitrogen, carbon dioxide, and mixtures composed of the abovementioned gases, preferably air, in particular compressed air. The gas flow rate can amount to 2 $m^3$/h per nozzle. The operating frequency can be from 10 to 30 kHz. The excitation voltage or the electrode voltage can be from 5 to 10 kV. Static or rotating plasma nozzles can be used. The component surface temperature can be from 5° C. to 250° C., preferably from 5° C. to 200° C.

The injection molding of thermoplastics is well known and has been widely described for materials among which are in particular polyamide and thermoplastic polyurethane. The principle of two-component (2-c) injection molding has been described by way of example in FIG. 2 in Simon Amesöder et al., Kunststoffe 9/2003, pages 124-129.

The temperature here during injection molding of thermoplastic polyurethane is preferably from 140 to 250° C., particularly preferably from 160 to 230° C. TPUs are preferably processed under very mild conditions. The temperatures can be adjusted as a function of hardness. Peripheral velocity during the plastifying process is preferably smaller than or equal to 0.2 m/s, and backpressure is preferably from 20 to 200 bar. Injection rate is preferably very low in order to minimize shear stress. The cooling time selected is preferably sufficiently long, hold pressure being preferably from 30 to 80% of injection pressure. The molds are preferably temperature-controlled to from 30 to 70° C. The gate is preferably selected to be at the strongest site on the component. A cascade of injection points can be used for large-surface-area in-mold coatings.

The temperature for injection molding of polyamide, polybutylene terephthalate and/or polyethylene terephthalate is well known to the person skilled in the art and is widely described in the literature. In this connection see also: Martin Bichler "Kunststoffteile fehlerfrei spritzgießen" [Defect-free injection molding of plastics parts] and company publications from manufacturers of injection-molding machinery, e.g. Demag ergotech: "Spritzgießen—kurz and bündig" [Injection molding in a nutshell].

The temperature for injection molding of polyamide is preferably from 230 to 350° C., particularly preferably from 250 to 330° C. The machine temperatures set can preferably be from 240 to 290° C., and the feed temperature can preferably be from 50 to 100° C. The injection pressure is usually from 50 to 2500 bar. Hold pressure is preferably maintained at from 70 to 200% of injection pressure. The plastification process preferably uses a peripheral screw velocity of up to 1 m/s, but the velocity used can particularly preferably be sufficiently low to permit completion of the plastification process during the cooling time.

The following examples can be given in relation to the components of rubber, engineering plastic, in particular polyamide, and thermoplastic polyurethane.

The general term "rubber" in this specification means well-known vulcanized, natural or synthetic rubbers. Prefabricated rubber items are preferably used in the inventive process.

The materials used and termed engineering plastics can be well-known products, such as polyamides, polycarbonates, polyacetals, polyesters, polymethacrylates, modified polyphenylene ethers, and also blends based on these plastics. For the definition of engineering plastics, see Römpp Chemie Lexikon [Römpp's Chemical Encyclopedia], 9th edition, 1992, Georg Thieme Verlag, Stuttgart, Germany. The engineering plastics can preferably have reinforcement, for example with glass fibers. Preferred engineering plastics that can be used are polyamide (PA), polybutylene terephthalate (PBT) and/or polyethylene terephthalate (PET). The polybutylene terephthalate and polyethylene terephthalate used can comprise well-known and commercially available products.

The polyamide used can comprise well-known grades of polyamide, such as PA 6 and/or PA 66, these preferably being composed of unbranched chains, preferably with number-average molar masses of from 15 000 to 50 000. Polyamide/ABS blends can also be used. Preference is also given to glass fiber-reinforced polyamide, e.g. polyamide, preferably nylon-6,6, comprising from 5 to 60% by weight of glass fibers, particularly preferably from 5 to 40% by weight of glass fibers, based on the total weight of the polyamide comprising the glass fibers.

Thermoplastic polyurethanes, also termed TPUs in this specification, and processes for their production are well known. TPUs are generally produced by reaction of (a) isocyanates with (b) compounds reactive toward isocyanates and usually having a molar mass ($M_w$) of from 500 to 10 000, preferably from 500 to 5000, particularly preferably from 800 to 3000, and with (c) chain extenders with a molar mass of from 50 to 499, if appropriate in the presence of (d) catalysts and/or of (e) conventional additives. The number-average molar mass of the thermoplastic polyurethanes is preferably from 40 000 g/mol to 150 000 g/mol. The melting point of the thermoplastic polyurethane is preferably from 180° C. to 230° C. It is preferable that the thermoplastic polyurethane has no free isocyanate groups.

The starting components and processes for production of the preferred polyurethanes will be described by way of example below. The components (a), (b), (c), and also, if appropriate, (d) and/or (e) usually used in production of the polyurethanes will be described by way of example below:

a) Organic isocyanates (a) which may be used are well-known aliphatic, cycloaliphatic, araliphatic, and/or aromatic isocyanates, for example tri-, tetra-, penta-, hexa-, hepta- and/or octamethylene diisocyanate, 2-methyl-penta-methylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate, and/or dicyclohexylmethane 4,4'-, 2,4'- and 2,2'-diisocyanate, diphenylmethane 2,2'-, 2,4'- and/or 4,4'-diisocyanate (MDI), naphthylene 1,5-diisocyanate (NDI), tolylene 2,4- and/or 2,6-diisocyanate (TDI), diphenylmethane diisocyanate, 3,3'-dimethyldiphenyl diisocyanate, 1,2-diphenylethane diisocyanate, and/or phenylene diisocyanate. 4,4'-MDI is preferably used. For powder slush applications, as described at the outset, preference is also given to aliphatic isocyanates, particular preference being given to 1-isocyanato-3,3,5-trimethyl-5-isocyanatomethylcyclohexane (isophorone diisocyanate, IPDI) and/or hexamethylene diisocyanate (HDI), in particular hexamethylene diisocyanate. As previously described at the outset, the isocyanate (a) used may also comprise prepolymers which have free isocyanate groups. The NCO content of these prepolymers is preferably from 10 to 25%. An advantage which the prepolymers can provide, due to the preliminary reaction that takes place during their preparation, is that lower reaction time is required for production of the TPUs.

b) Compounds (b) which may be used and are reactive toward isocyanates are the well-known compounds reactive toward isocyanates, for example polyesterols, polyetherols, and/or polycarbonatediols, these usually also being combined under the term "polyols", having molar masses of from 500 to 8000, preferably from 600 to 6000, in particular from 800 to less than 3000, and preferably having an average functionality toward isocyanates of from 1.8 to 2.3, preferably from 1.9 to 2.2, in particular 2. It is preferable to use polyether polyols, such as those based on well-known starter substances and on conventional alkylene oxides, e.g. ethylene oxide, propylene oxide, and/or butylene oxide, preference being given to polyetherols based on propylene 1,2-oxide and ethylene oxide, and in particular polyoxytetramethylene glycols. The polyetherols have the advantage of having greater hydrolysis resistance than polyesterols.

The polyetherols used may also comprise what are known as low-unsaturation polyetherols. For the purposes of this invention, low-unsaturation polyols are in particular polyether alcohols whose content of unsaturated compounds is less than 0.02 meq/g, preferably less than 0.01 meq/g.

Such polyether alcohols are mostly prepared by addition reaction of alkylene oxides, in particular ethylene oxide, propylene oxide and mixtures of these, onto the triols or diols described above in the presence of high-activity catalysts. Examples of these high-activity catalysts are cesium hydroxide and multimetal cyanide catalysts, also termed DMC catalysts. A DMC catalyst often used is zinc hexacyanocobaltate. The DMC catalyst may be left in the polyether alcohol after the reaction, but is usually removed, for example by sedimentation or filtration.

Polybutadienediols whose molar mass is from 500 to 10 000 g/mol, preferably from 1000 to 5000 g/mol, in particular from 2000 to 3000 g/mol, may also be used. TPUs produced using these polyols can be radiation-crosslinked after thermoplastic processing. This gives better combustion performance, for example.

Instead of one polyol, it is also possible to use a mixture of various polyols.

c) Chain extenders (c) that may be used comprise well-known aliphatic, araliphatic, aromatic and/or cycloaliphatic compounds having a molar mass of from 50 to 499, preferably difunctional compounds, such as diamines and/or alkanediols having from 2 to 10 carbon atoms in the alkylene radical, in particular 1,3-propanediol, 1,4-butanediol, 1,6-hexanediol, and/or di-, tri-, tetra-, penta-, hexa-, hepta-, octa-, nona- and/or decaalkylene glycols having from 3 to 8 carbon atoms, and preferably corresponding oligo- and/or polypropylene glycols, and use may also be made of a mixture of the chain extenders.

Components a) to c) are particularly preferably difunctional compounds, i.e. diisocyanates (a), difunctional polyols, preferably polyetherols (b), and difunctional chain extenders, preferably diols.

d) Suitable catalysts which in particular accelerate the reaction between the NCO groups of the diisocyanates (a) and the hydroxy groups of the structural components (b) and (c) are the conventional tertiary amines known from the prior art, e.g. triethylamine, dimethylcyclohexylamine, N-methylmorpholine, N,N'-dimethylpiperazine, 2-(dimethylaminoethoxy)ethanol, diazabicyclo-[2.2.2]octane and the like, and also in particular organometallic compounds, such as titanic esters, iron compounds, e.g. ferric acetylacetonate, tin compounds, e.g. stannous diacetate, stannous dioctoate, stannous dilaurate, or the dialkyltin salts of aliphatic carboxylic acids, e.g. dibutyltin diacetate, dibutyltin dilaurate, or the like. The amounts usually used of the catalysts are from 0.0001 to 0.1 part by weight per 100 parts by weight of polyhydroxy compound (b).

Alongside catalysts (d), conventional auxiliaries and/or additives (e) may also be added to the structural components (a) to (c). By way of example, mention may be made of blowing agents, surface-active substances, nucleating agents, lubricants and mold-release agents, dyes and pigments, antioxidants, e.g. those active in relation to hydrolysis, light, heat or discoloration, inorganic and/or organic fillers, flame retardants, reinforcing agents, plasticizers, and metal deactivators. In one preferred embodiment, hydrolysis stabilizers such as polymeric and low-molar mass carbodiimides are among component (e). The thermoplastic polyurethane particularly preferably comprises melamine cyanurate, which acts as flame retardant, in the inventive materials. The amount of melamine cyanurate used is preferably from 0.1 to 60% by weight, particularly preferably from 5 to 40% by weight, in particular from 15 to 25% by weight, based in each case on the total weight of the TPU. The thermoplastic polyurethane preferably comprises an amount of from 0.1 to 5% by weight, based on the total weight of the thermoplastic polyurethane, of antioxidants, and triazole, and/or triazole derivative. Suitable antioxidants are generally substances which inhibit or prevent undesired oxidative processes in the plastic to be protected. Antioxidants are generally commercially available. Examples of antioxidants are sterically hindered phenols, aromatic amines, thiosynergists, organophosphorus compounds of trivalent phosphorus, and hindered amine light stabilizers. Examples of sterically hindered phenols are found in Plastics Additive Handbook, 5th edition, H. Zweifel, ed., Hanser Publishers, Munich, 2001 ([1]), pp. 98-107 and pp. 116-121. Examples of aromatic amines are found in [1] pp. 107-108. Examples of thiosynergists are given in [1], pp. 104-105 and pp. 112-113. Examples of phosphites are found in [1], pp. 109-112. Examples of hindered amine light stabilizers are given in [1], pp. 123-136. Phenolic antioxidants are preferably suitable for use. In one preferred embodiment, the antioxidants, in particular the phenolic antioxidants, have a molar mass greater than 350 g/mol, particularly preferably greater than 700 g/mol, and a maximum molar mass <10 000 g/mol, preferably <3000 g/mol. They also preferably have a melting point below 180° C. It is also preferable to use antioxidants which are amorphous or liquid.

Besides the components a), b), and c) mentioned, and if appropriate d) and e), it is also possible to use chain regulators, usually with molar mass of from 31 to 3000. These chain regulators are compounds which have only one functional group reactive toward isocyanates, examples being monohydric alcohols, monobasic amines, and/or monohydric polyols. These chain regulators can give precise control of flow behavior, in particular in the case of TPUs. The amount of chain regulators which may generally be used is from 0 to 5 parts by weight, preferably from 0.1 to 1 part by weight, based on 100 parts by weight of component b), and the chain regulators are defined as part of component (c).

All of the molar masses mentioned in this specification have the unit [g/mol].

To adjust the hardness of the TPUs, the molar ratios of the structural components (b) and (c) may be varied relatively widely. Successful molar ratios of component (b) to the entire amount of chain extenders to be (c) used are from 10:1 to 1:10, in particular from 1:1 to 1:4, and the hardness of the TPUs here rises as content of (c) increases.

The thermoplastic polyurethane used preferably comprises flexible plasticizer-free thermoplastic polyurethane whose hardness is preferably less than 95 and more preferably up to 90 Shore A. In applications where wear is a factor, and in impact-protection applications, any of the TPUs up to 80 Shore D can be used. Ether TPUs are to be preferred in applications susceptible to hydrolysis. Aliphatic TPUs are to be preferred in applications particularly exposed to light. The number-average molar mass of the thermoplastic polyurethane is preferably at least 40 000 g/mol, particularly preferably at least 80 000 g/mol, in particular at least 120 000 g/mol.

It is particularly preferable that the Shore hardness of the thermoplastic polyurethane is from 45 A to 80 A, and that its tensile strength to DIN 53504 is greater than 15 MPa, and that its tear propagation resistance to DIN 53515 is greater than 30 N/mm, and that its abrasion value to DIN 53516 is smaller than 250 mm$^3$.

Another particular feature of the inventive items is the excellent adhesion between the thermoplastic polyurethane and the engineering plastic, in particular the polyamide, and, respectively, the rubber. Particular preference is therefore also given to items in which, for the bond between rubber and thermoplastic polyurethane, and for the bond between engineering plastic, in particular polyamide, and thermoplastic polyurethane, the peel resistance to DIN EN 1464 is in each case at least 1 N/mm, preferably at least 2 N/mm.

Particular preference is given to TPUs according to WO 03/014179 on grounds of their particularly good adhesion. The statements hereinafter extending as far as the examples relate to these particularly preferred TPUs. These TPUs have particularly good adhesion because the processing temperatures are higher than for other "traditional" TPUs of comparable hardness, and these conditions permit achievement of the best bond strengths. These particularly preferred TPUs are preferably obtainable via reaction of (a) isocyanates with (b1) polyesterdiols whose melting point is greater than 150° C., (b2) polyetherdiols and/or polyesterdiols whose melting point is in each case below 150° C. and whose molar mass is in each case from 501 to 8000 g/mol, and also, if appropriate, (c) diols whose molar mass is from 62 g/mol to 500 g/mol. Particular preference is given here to thermoplastic polyurethanes in which the molar ratio of the diols (c) whose molar mass is from 62 g/mol to 500 g/mol to component (b2) is smaller than 0.2, particularly preferably from 0.1 to 0.01. Particular preference is given to thermoplastic polyurethanes in which the polyesterdiols (b1) whose molar mass is preferably from 1000 g/mol to 5000 g/mol have the following structural unit (I):

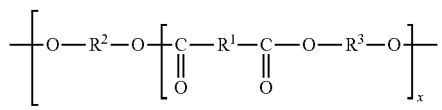

where the definitions of R$^1$, R$^2$, and X are as follows:
R$^1$: carbon skeleton having from 2 to 15 carbon atoms, preferably an alkylene group having from 2 to 15 carbon atoms and/or a bivalent aromatic radical having from 6 to 15 carbon atoms, particularly preferably having from 6 to 12 carbon atoms
R$^2$: if appropriate branched-chain alkylene group having from 2 to 8 carbon atoms, preferably from 2 to 6, particularly preferably from 2 to 4 carbon atoms, in particular —CH$_2$—CH$_2$— and/or —CH$_2$—CH$_2$—CH$_2$—CH$_2$—,
R$^3$: if appropriate branched-chain alkylene group having from 2 to 8 carbon atoms, preferably from 2 to 6, particularly preferably from 2 to 4 carbon atoms, in particular —CH$_2$—CH$_2$— and/or —CH$_2$—CH$_2$—CH$_2$—CH$_2$—,
X: a whole number from the range 5 to 30. In this preferred embodiment, the preferred melting point described at the outset and/or the preferred molar mass are based on the structural unit (I) described.

In this specification, the expression "melting point" means the maximum of the melting peak of a heating curve measured using commercially available DSC equipment (e.g. Perkin-Elmer DSC 7).

Molar masses stated in this specification are number-average molar masses in [g/mol].

These particularly preferred thermoplastic polyurethanes can preferably be prepared by reacting a preferably high-molecular-weight, preferably semicrystalline, thermoplastic polyester with a diol (c), and then reacting the reaction product from (i), comprising (b1) polyester diol whose melting point is greater than 150° C. and, if appropriate (c) diol together with (b2) polyether diols and/or polyester diols in each case with a melting point smaller than 150° C. and with a molar mass of from 501 to 8000 g/mol, and also, if appropriate, with further (c) diols whose molar mass is from 62 to 500 g/mol, with (a) isocyanate, if appropriate in the presence of (d) catalysts and/or (e) auxiliaries.

The molar ratio of the diols (c) whose molar mass is from 62 g/mol to 500 g/mol to component (b2) during the reaction (ii) is preferably smaller than 0.2, more preferably from 0.1 to 0.01.

While step (i) provides the hard phases for the final product via the polyester used in step (i), the use of component (b2) in step (ii) constructs the soft phases. The preferred technical teaching is that polyesters having a pronounced hard-phase structure which crystallizes well are preferably melted in a reactive extruder and are first degraded using a low-molecular-weight diol to give shorter polyesters having free hydroxy end groups. The original high crystallization tendency of the polyester is retained during this process and can then be utilized on rapid reaction to obtain TPUs with the advantageous properties, such as high tensile strength values, low abrasion values, and, because of the high and narrow melting range, high heat resistances and low compression sets. The preferred process therefore preferably degrades high-molecular-weight, semicrystalline, thermoplastic polyesters using low-molecular-weight diols (c) under suitable conditions in a short reaction time to give rapidly crystallizing polyester diols (b1) which then in turn are incorporated, using other polyester diols and/or polyether diols, and diisocyanates, into high-molecular-weight polymer chains.

Prior to the reaction (i) with the diol (c), the molar mass of the thermoplastic polyester used is preferably from 15 000 g/mol to 40 000 g/mol, its melting point preferably being greater than 160° C., particularly preferably from 170° C. to 260° C.

The starting material, i.e. the polyester, reacted in step (i), preferably in the molten state, particularly preferably at a temperature of from 230° C. to 280° C., preferably for a period of from 0.1 min to 4 min, particularly preferably from 0.3 min to 1 min, with the diol(s) (c) may comprise well-known, preferably high-molecular-weight, preferably semi-crystalline, thermoplastic polyesters, for example in pelletized form. By way of example, suitable polyesters are based on aliphatic, cycloaliphatic, araliphatic, and/or aromatic dicarboxylic acids, such as lactic acid and/or terephthalic acid, and on aliphatic, cycloaliphatic, araliphatic, and/or aromatic dialcohols, such as 1,2-ethanediol, 1,4-butanediol, and/or 1,6-hexanediol.

The polyester used particularly preferably comprises: poly-L-lactic acid and/or polyalkylene terephthalate, such as polyethylene terephthalate, polypropylene terephthalate, polybutylene terephthalate, in particular polybutylene terephthalate.

The preparation of these esters from the starting materials mentioned is well-known to the person skilled in the art and has been widely described. Suitable polyesters are, moreover, available commercially.

The thermoplastic polyester is preferably melted at a temperature of from 180° C. to 270° C. The reaction (i) with the diol (c) is preferably carried out at a temperature of from 230° C. to 280° C., preferably from 240° C. to 280° C.

The diol (c) used in step (i) for reaction with the thermoplastic polyester and, if appropriate, in step (ii) can comprise well-known diols whose molar mass is from 62 to 500 g/mol, for example those mentioned below, e.g. ethylene glycol, 1,3-propanediol, 1,4-butanediol, 1,5-pentanediol, 1,6-hexanediol, heptanediol, octanediol, preferably 1,4-butanediol and/or 1,2-ethanediol.

The ratio by weight of thermoplastic polyester to the diol (c) in step (i) is usually from 100:1.0 to 100:10, preferably from 100:1.5 to 100:8.0.

The reaction of the thermoplastic polyester with the diol (c) in reaction step (i) is preferably carried out in the presence of conventional catalysts, such as those described below. It is preferable that catalysts based on metals are used for this reaction. The reaction in step (i) is preferably carried out in the presence of from 0.1 to 2% by weight of catalysts, based on the weight of the diol (c). Reaction in the presence of catalysts of this type is advantageous in order to permit conduct of the reaction in the reactor, such as a reactive extruder, within the short residence time available.

Examples of catalysts which can be used for this reaction step (i) are: tetrabutyl orthotitanate and/or stannous dioctoate, preferably stannous dioctoate.

The polyester diol (b1) which is a reaction product from (i) preferably has a molar mass of from 1000 g/mol to 5000 g/mol. The melting point of the polyester diol which is a reaction product from (i) is preferably from 150° C. to 260° C., in particular from 165 to 245° C. This means that the reaction product of the thermoplastic polyester with the diol (c) in step (i) comprises compounds with the melting point mentioned, these being used in the subsequent step (ii).

By virtue of the reaction of the thermoplastic polyester with the diol (c) in step (i), the polymer chain of the polyester is cleaved via the diol (c), via transesterification. The reaction product of the TPU therefore has free hydroxy end groups, and is preferably further processed in the further step (ii) to give the actual product, the TPU.

The reaction of the reaction product of step (i) in step (ii) preferably takes place via addition of a) isocyanate (a), and also (b2) polyether diols and/or polyester diols, in each case with a melting point smaller than 150° C. and with a molar mass of from 501 to 8000 g/mol, and also, if appropriate, of other diols (c) whose molar mass is from 62 to 500, of (d) catalysts, and/or of (e) auxiliaries to the reaction product from (i). The reaction of the reaction product with the isocyanate takes place by way of the hydroxy end groups produced in step (i). The reaction in step (ii) preferably takes place at a temperature of from 190 to 250° C., preferably for a period of from 0.5 to 5 min, particularly preferably from 0.5 to 2 min, preferably in a reactive extruder, particularly preferably in the same reactive extruder in which step (i) was also carried out. By way of example, the reaction of step (i) can take place in the first barrel sections of a conventional reactive extruder and the corresponding reaction of step (ii) can be carried out at a subsequent point, i.e. in downstream barrel sections, after addition of components (a) and (b2). By way of example, the first 30-50% of the length of the reactive extruder can be used for step (i), and the remaining 50-70% can be used for step (ii).

An excess of the isocyanate groups over the groups reactive toward isocyanates is preferably present during the reaction in step (ii). The ratio of the isocyanate groups to the hydroxy groups in the reaction (ii) is preferably from 1:1 to 1.2:1, particularly preferably from 1.02:1 to 1.2:1.

The reactions (i) and (ii) are preferably carried out in a well-known reactive extruder. These reactive extruders are described by way of example in the company publications from Werner & Pfleiderer or in DE-A 2 302 564.

The method of carrying out the preferred process is preferably such that at least one thermoplastic polyester, e.g. polybutylene terephthalate, is metered into the first barrel section of a reactive extruder and is melted at temperatures which are preferably from 180° C. to 270° C., preferably from 240° C. to 270° C., and, in a subsequent barrel section, a diol (c), e.g. butanediol, and preferably a transesterification catalyst are added, and the polyester is degraded at temperatures of from 240° C. to 280° C. by the diol (c) to give polyester oligomers having hydroxy end groups and having molar masses of from 1000 to 5000 g/mol, and, in a subsequent barrel section, isocyanate (a) and (b2) compounds reactive toward isocyanates and having a molar mass of from 501 to 8000 g/mol and also, if appropriate, (c) diols whose molar mass is from 62 to 500, (d) catalysts, and/or (e) auxiliaries are metered in, and then, at temperatures of from 190 to 250° C., the preferred thermoplastic polyurethanes are constructed.

In step (ii), it is preferable that no (c) diols whose molar mass is from 62 to 500 are introduced, except for the (c) diols comprised in the reaction product of (i) and having a molar mass of from 62 to 500.

In the region in which the thermoplastic polyester is melted, the reactive extruder preferably has neutral and/or reverse-conveying kneading blocks and reverse-conveying elements, and in the region where the thermoplastic polyester is reacted with the diol it preferably has mixing elements on the screw, and toothed disks, and/or toothed mixing elements in combination with reverse-conveying elements.

Downstream of the reactive extruder, the clear melt is usually introduced by means of a gear pump to an underwater pelletizer, and pelletized.

The particularly preferred thermoplastic polyurethanes exhibit optically clear, single-phase melts, which solidify rapidly and, as a consequence of the semicrystalline polyester hard phase, form slightly opaque to white opaque moldings. The rapid solidification behavior is a decisive advantage over known mixing specifications and preparation processes for thermoplastic polyurethanes. The rapid solidification behavior is so pronounced that it is even possible to process products with hardnesses of from 50 to 60 Shore A by injection molding with cycle times smaller than 35 s. In extrusion, too, e.g. in production of blown films, no problems typical of TPU arise, e.g. adhesion or blocking of the foils or bubbles.

The proportion of the thermoplastic polyester in the final product, i.e. in the thermoplastic polyurethane, is preferably from 5 to 75% by weight. The preferred thermoplastic polyurethanes are particularly preferably products of the reaction of a mixture comprising from 10 to 70% by weight of the reaction product from (i), from 10 to 80% by weight of (b2), and from 10 to 20% by weight of (a), these weight data being based on the total weight of the mixture comprising (a), (b2), (d), (e), and the reaction product from (i).

The hardness of the preferred thermoplastic polyurethanes is preferably from Shore 45 A to Shore 78 D, particularly preferably from 50 A to 75 D.

The preferred thermoplastic polyurethanes preferably have the following structural unit (II):

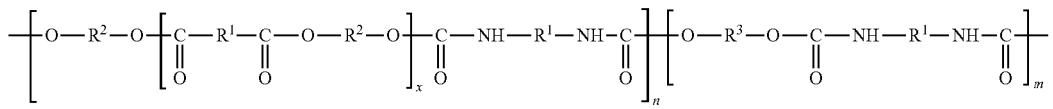

with the following definitions for $R^1$, $R^2$, $R^3$, and X:
- $R^1$: carbon skeleton having from 2 to 15 carbon atoms, preferably an alkylene group having from 2 to 15 carbon atoms and/or an aromatic radical having from 6 to 15 carbon atoms,
- $R^2$: if appropriate branched-chain alkylene group having from 2 to 8 carbon atoms, preferably from 2 to 6, particularly preferably from 2 to 4 carbon atoms, in particular —$CH_2$—$CH_2$— and/or —$CH_2$—$CH_2$—$CH_2$—,
- $R^3$: a radical resulting from the use of polyether diols and/or polyester diols in each case having molar masses of from 501 g/mol to 8000 g/mol as (b2) or from the use of alkanediols having from 2 to 12 carbon atoms for the reaction with diisocyanates,
- X: a whole number from the range from 5 to 30,
- n, m: a whole number from the range from 5 to 20.

The radical $R^1$ is defined via the isocyanate used, and the radical $R^2$ is defined via the reaction product of the thermoplastic polyester with the diol (c) in (i), and the radical $R^3$ is defined via the starting components (b2) and, if appropriate (c) during the preparation of the TPUs.

Examples:
Composites were produced with the following components by means of two-component injection molding:
1) NR natural rubber, 70 Shore A, with Elastollan® C 65 A 15 HPM (Elastogran GmbH) and Ultramid® B 3 K (BASF Aktiengesellschaft)
2) SBR styrene-butadiene rubber, 70 Shore A, with Elastollan® C 65 A 15 HPM (Elastogran GmbH) and Ultramid® B 3 WG 6 (BASF Aktiengesellschaft)
3) NBR nitrile-butadiene rubber, 70 Shore A, with Elastollan® C 65 A 15 HPM (Elastogran GmbH) and Ultramid® A 3 WG 6 (BASF Aktiengesellschaft)

The surface of the rubber part here was plasma-treated, using a system from Plasmatreat with RD1004 plasma generator. The plasma source was moved within a distance of 6 mm and with a velocity of 2 m/min relative to the surface of the rubber item. The plasma was transported via gas flow along the discharge path onto the surface of the rubber item. The plasma-treatment time was 5 s. The gas used comprised compressed air. The gas flow rate was 2 m³/h per nozzle. The operating frequency was 18 kHz. The excitation voltage or the electrode voltage was 8 kV. A rotating plasma nozzle was used. The surface temperature of the rubber part was 30° C.

The rubber parts were then inserted into an injection molding apparatus, and the thermoplastic polyurethane was injected molded onto the plasma-treated surface. The temperature during the injection molding of the thermoplastic polyurethane here was 210° C. The peripheral velocity during plastification was 0.1 m/s, and the backpressure was 20 bar. The amount of TPU injected amounted to 40 g.

Once the thermoplastic polyurethane had hardened, i.e. after about 40 sec., the component was removed and placed in another mold on another machine, and the polyamide was injection-molded onto the material. Injection-molding onto the material would be possible in one machine without difficulty, given appropriate machine technology. The temperature for injection-molding of polyamide amounted to 260° C.

The machine temperatures set amounted to from 240 to 260° C., and the temperature of the feed amounted to 40° C. Injection pressure was 200 bar. Hold pressure was maintained at 100% of injection pressure. The plastification process used a peripheral screw velocity of 0.2 m/s.

A feature of the composite elements was that the TPU had very good adhesion not only to the rubber but also to the polyamide.

The invention claimed is:

1. A process for production of an item comprising a thermoplastic polyurethane, which has direct-contact adhesive bonding to a rubber and to an engineering plastic, which comprises plasma-treating the surface of a rubber item, then bringing the thermoplastic polyurethane into contact with the plasma-treated surface, and then applying the engineering plastic to the thermoplastic polyurethane,
wherein the method of plasma-treatment of the rubber is such that a plasma is generated by means of high-voltage discharge in a plasma source, this plasma is brought into contact with the surface of the rubber item by means of a plasma nozzle, and the plasma source is moved within a distance of from 2 to 25 mm with a velocity of from 0.1 m/min to 400 m/min relative to the surface of the rubber item.

2. The process according to claim 1, wherein the thermoplastic polyurethane is present between the rubber and the engineering plastic.

3. The process according to claim 2, wherein the thermoplastic polyurethane forms a layer whose thickness is from 0.2 mm to 6 mm.

4. The process according to claim 1, wherein the thermoplastic polyurethane is applied by means of injection molding to the plasma-treated surface of the rubber.

5. The process according to claim 1, wherein the engineering plastic is applied by means of injection molding to the surface of the thermoplastic polyurethane.

6. The process according to claim 1, wherein the surface of the rubber is plasma-treated, the plasma-treated rubber is inserted into a mold, the thermoplastic polyurethane is then applied by means of injection molding to the plasma-treated surface, and then the engineering plastic is molded by means of injection molding onto the thermoplastic polyurethane in the same mold.

7. The process according to claim 1, wherein the plasma-treatment time is from 1 ms to 100 s.

8. The process according to claim 1, wherein the Shore A hardness of the thermoplastic polyurethane is smaller than 95 and the thermoplastic polyurethane comprises no plasticizers.

9. The process according to claim 1, wherein the Shore hardness of the thermoplastic polyurethane is from 45 A to 80 A, its tensile strength to DIN 53504 is greater than 15 MPa, its tear propagation resistance to DIN 53515 is greater than 30 N/mm, and its abrasion value to DIN 53516 is smaller than 250 mm³.

10. The process according to claim 1, wherein the thermoplastic polyurethane is not plasma-treated.

11. The process according to claim 1, wherein the engineering plastic is a polyamide, polybutylene terephthalate, and/or polyethylene terephthalate.

12. The process according to claim 1, wherein the engineering plastic is a polyamide.

13. The process according to claim 1, wherein the engineering plastic is a polybutylene terephthalate.

14. The process according to claim 1, wherein the rubber is a vulcanized rubber.

15. The process according to claim 1, wherein the rubber is a natural rubber or a synthetic rubber.

16. The process according to claim 1, wherein the thermoplastic polyurethane has a number-average molar mass of 40,000 to 150,000 g/mol.

17. The process according to claim 1, wherein the thermoplastic polyurethane has a melting point of from 180° C. to 230° C.

18. The process according to claim 1, wherein the thermoplastic polyurethane has no free isocyanate groups.

19. The process according to claim 1, wherein the engineering plastic is selected from the group consisting of polyamides, polycarbonates, polyacetals, polyesters, polymethacrylates, modified polyphenylene ethers and blends thereof.

20. The process according to claim 1, wherein no adhesion promoter is present between the thermoplastic polyurethane and the rubber and between the thermoplastic polyurethane and the engineering plastic.

* * * * *